(12) United States Patent
Keats

(10) Patent No.: US 7,730,667 B2
(45) Date of Patent: Jun. 8, 2010

(54) STACKABLE PLANT POT

(76) Inventor: John Rodney Keats, 22A Lambton St., Lamton, NSW 2299 (AU)

( * ) Notice: Subject to any disclaimer, the term of this patent is extended or adjusted under 35 U.S.C. 154(b) by 3 days.

(21) Appl. No.: 10/568,209

(22) PCT Filed: Aug. 13, 2004

(86) PCT No.: PCT/AU2004/001095

§ 371 (c)(1),
(2), (4) Date: Nov. 6, 2006

(87) PCT Pub. No.: WO2005/015976

PCT Pub. Date: Feb. 24, 2005

(65) Prior Publication Data

US 2007/0186469 A1    Aug. 16, 2007

(30) Foreign Application Priority Data

Aug. 13, 2003   (AU) .............................. 2003904312

(51) Int. Cl.
*A01G 25/00* (2006.01)
*A01G 9/02* (2006.01)
(52) U.S. Cl. ............................................ 47/83; 47/79
(58) Field of Classification Search ................ 47/79, 47/80, 82, 83, 71

See application file for complete search history.

(56) References Cited

U.S. PATENT DOCUMENTS

| | | | | |
|---|---|---|---|---|
| 196,937 | A | * 11/1877 | Russell | .......................... 47/71 |
| 3,452,475 | A | 7/1969 | Johnson | |
| 4,102,081 | A | 7/1978 | Morrow | |
| 4,419,843 | A | * 12/1983 | Johnson, Sr. | .................... 47/82 |
| 5,555,676 | A | * 9/1996 | Lund | ............................ 47/82 |
| 2001/0052199 | A1 | 12/2001 | Klein et al. | |

FOREIGN PATENT DOCUMENTS

| | | |
|---|---|---|
| AU | 586493 | 2/1988 |
| AU | 634522 | 8/1991 |
| DE | 27 04 414 | 9/1978 |
| DE | 3618833 | 12/1987 |
| EP | 0 142 471 | 5/1985 |
| FR | 2 715 269 | 7/1995 |
| GB | 2 369 980 | 6/2002 |
| WO | WO 98/56233 | 12/1998 |

* cited by examiner

*Primary Examiner*—Michael R Mansen
*Assistant Examiner*—Monica L Williams
(74) *Attorney, Agent, or Firm*—Ladas & Parry LLP

(57) ABSTRACT

A plant pot (1) which, in use, is adapted to be stacked with one or more similar plant pots, the plant pot comprising: (a) cavity (5) including a water reservoir region (7) and a soil holding region (6) located above the reservoir region (7); (b) separation means (10) adapted to separate the reservoir region (7) from the soil holding region (6); (c) an overflow outlet (8) in the reservoir region (7) adapted to enable excess water to flow out the reservoir region (7).

21 Claims, 21 Drawing Sheets

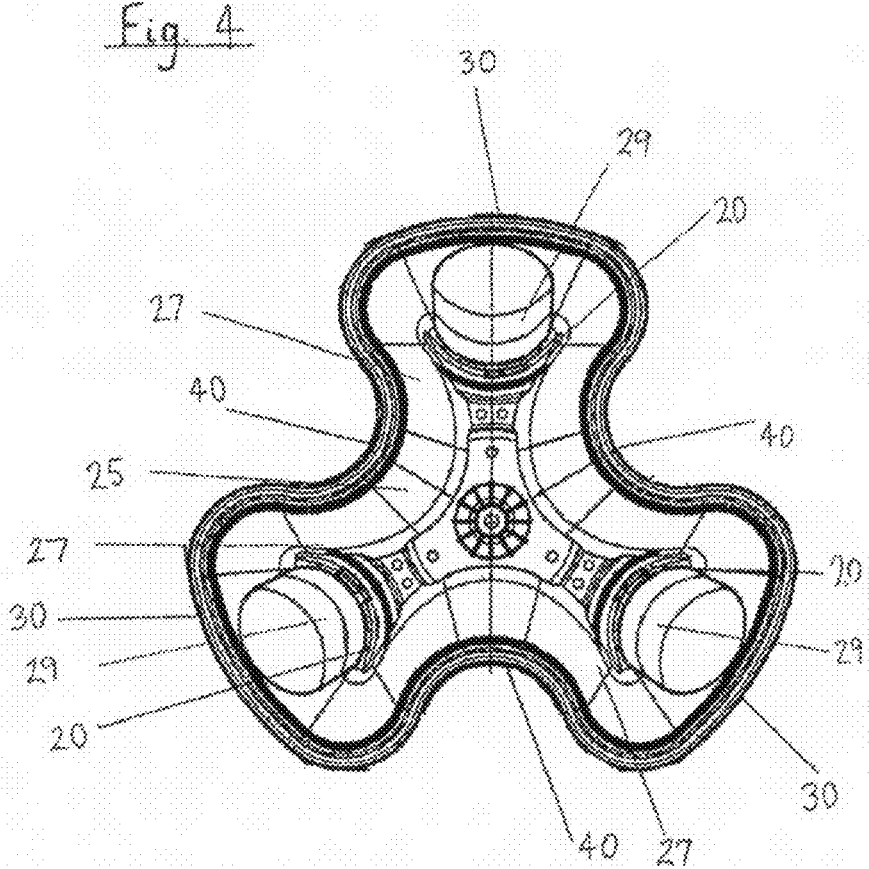
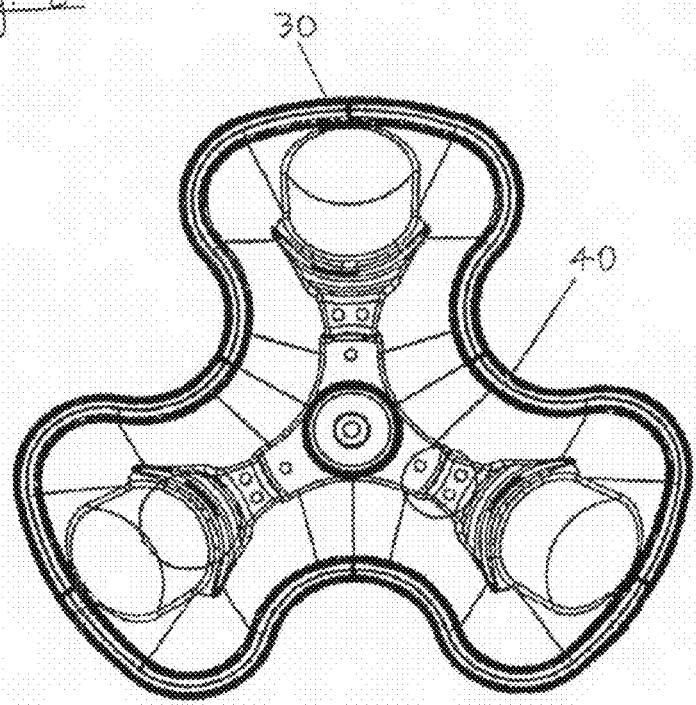

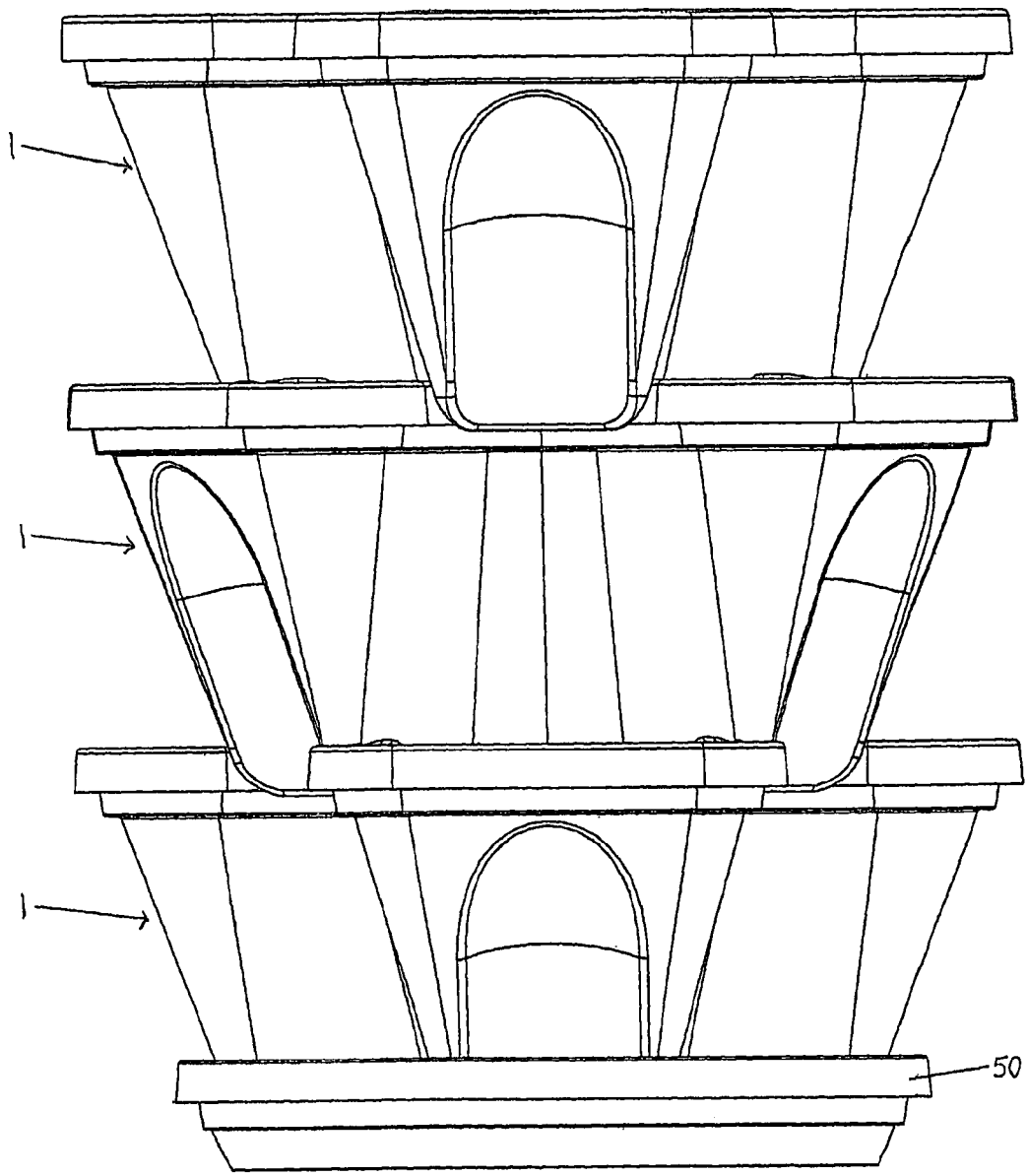

These Slotted areas are situated to accept the tray tabs and lock them into place

STACKABLE PLANT POT

TECHNICAL FIELD

The present invention relates to stackable plant pots and, in particular, to easily waterable stackable plant pots.

BACKGROUND

Various forms of plant pots are known for growing plants. Typical plant pots are either of generally cylindrical, frustoconical or rectangular prism form. Frustoconical type plant pots, or other plant pots which are tapered so that the bottom of each pot is narrower than the top, are advantageous over cylindrical or rectangular prism type pots in that they are often able to be located at least partially within each other and thereby able to be stacked for transport, storage and display, thereby realising considerable space savings. Generally, however, such plant pots can not be stacked—one on top of another—in any suitable manner for use. Many pot plant enthusiasts like to arrange several pots in a generally vertical relationship for particular aesthetic appeal and saving of space. Such an arrangement currently typically depends on use of a separate stand to mount the pots or the hanging of one pot from another with chains or the like.

Several attempts have been made to provide stackable plant pots. One such attempt is disclosed in Australian patent no. 634522 in the name of Gromax Systems, Inc. This patent discloses a multiplicity of plant pots having an essentially square-shaped cross section. The plant pots can be stacked on top of one another by having each plant pot rotated approximately 45 degrees about a common axis relative to an adjacent plant pot. The adjacent plant pots are seated one on top of the other, consequently requiring that the individual plant pots (particularly those located towards the bottom) are particularly strong and rigid. This arrangement provides only a very small useable area for growing plants, namely, the small corner portions which protrude beyond the pot immediately above. Also, this arrangement of plant pots is not adapted to be hung or suspended.

Australian patent no. 586493, in the name of Steven Fraknoi, also discloses an arrangement of stacked plant pots. Each pot is adapted to be seated upon a pot located immediately beneath it. In order to support the weight of a series of stacked pots, each individual pot must be particularly strong so that pots near the base of the arrangement are not squashed or deformed. Also, the particular design and construction of each individual pot is quite complex and it would be difficult and expensive to manufacture. This particular arrangement of plant pots is also not adapted to be hung or suspended.

European patent no. 0 142 471, in the name of Werner Gerber, discloses a plant pot adapted to be stacked one on top of another. The plant pot of this disclosure is relatively flimsy and the stacking of 3 or more plant pots (especially if they contain soil) is likely to cause the lower pots in the arrangement to collapse or deform. The pots of this disclosure have connecting means comprising protruding tabs extending from an upper rim of each pot for insertion in a corresponding slot in a base of an adjoining pot. This arrangement for connecting adjacent pots is awkward for a user, given the relatively small sizes of the corresponding protrusions and slots. The arrangement also provides no added strength to the arrangement of pots.

International patent application no. PCT/AU98/00432 discloses a plant pot which, in use, is adapted to be stacked with one or more other similar plant pots. The relevant plant pot includes an upper rim made up of lobe rims and bridge rims, a base portion and a surrounding wall extending between the upper rim and the base portion, shaped so as to define a plurality of radially extending lobe sections. The base portion includes a recess (eg channel) formed in an underside of each lobe section. The upper rim and the recesses (eg channels) are configured in such a way that, when 2 or more plant pots are stacked, the rim and the recesses of adjoining plant pots inter-engage to hold the plant pots firmly in place. In the particular arrangement described, the recesses in the base portion are adapted to overlie portions of the upper rim thereby holding adjoining plant pots in position and, at the same time, providing a substantial degree of structural rigidity of the stack of plant pots.

The stack of pots disclosed in PCT/AU98/00432 is structurally very strong owing to the configuration of the rim and the recesses and to the manner in which these inter-engage. The lobe sections of adjoining plant pots are off-set so that a lobe section of one plant pot does not obstruct a lobe section of a plant pot immediately beneath it.

One of the deficiencies in the prior art devices discussed above relates to the watering of plants within a stack of plant pots. Presently, watering is effected in a number of different ways. For instance, each plant pot in the stack may be separately watered by pouring water into each plant pot in the stack. Alternatively, the plant pots may have one or more holes located in lower portions thereof so that water can pass from an upper pot to a lower pot. However, a problem with this arrangement is that water in the upper pots is not retained and the water eventually flows down to all of the lower plant pots leaving the upper plant pots with insufficient retained water. Consequently, the lower plant pots typically end up having too much water whereas the upper pots tend to have too little water.

Accordingly, this invention is directed towards a stackable plant pot which is adapted to form a stack of plant pots which, following watering, are adapted to retain a desired amount of water in each plant pot within the stack.

SUMMARY OF INVENTION

According to a first aspect of this invention, there is provided a plant pot which, in use, is adapted to be stacked with one or more similar plant pots, said plant pot comprising:
 a cavity including a water reservoir region and a soil holding region located above said reservoir reason;
 separation means adapted to separate the water reservoir region from the soil holding region; and
 an overflow outlet in the reservoir region adapted to enable excess water to flow out of said reservoir region.

The water reservoir region may be laterally defined by a side wall of the plant pot, such as a side wall which extends entirely about the plant pot. Alternatively, the water reservoir region may be laterally defined by a dam wall (eg an inner surface of the dam wall) extending upwardly from a base of the plant pot. This dam wall may substantially follow the contour of the surrounding wall of the plant pot. However, the contour of the dam wall can be of any other suitable shape, such as circular, rectangular, square, oval, triangular or any other such shape. Alternatively, the water reservoir region may be laterally defined by a combination of both:
 (a) the sidewall of the plant pot; and
 (b) one or more dam walls.

The water reservoir region may also comprise a number of separate water pools within the plant pot.

In an embodiment in which the water reservoir region is laterally defined (either completely or partially) by a surrounding wall of the plant pot, the overflow outlet may include one or more holes in the surrounding wall. Where the water reservoir region is laterally defined (either completely or partially) by a dam wall, the overflow outlet may include one or more holes in an upper portion of the dam wall. Obviously, these holes (in either the surrounding wall or the dam wall) will be positioned at a height at or slightly above the desired water level of the water reservoir region.

Alternatively, the overflow outlet may comprise a gap between an upper rim of the dam wall and the separation plate. The separation plate may be seated upon the upper rim of the dam wall, in which case the abovementioned gap may comprise one or more grooves, bites, cut-outs or slots in the upper rim of the dam wall. Alternatively, the gap may comprise one or more grooves, bites, cut-outs or slots in a peripheral portion of the separation means.

The plant pot may further include an overflow chamber laterally defined by an outer surface of the dam wall and the surrounding wall (or a portion of the surrounding wall) of the plant pot. This overflow chamber is adapted to receive water which flows over or through the dam wall from the water reservoir region. The water overflow chamber typically (but not necessarily) extends fully around the dam wall. Alternatively, the overflow chamber may comprise one or more sub-chambers located at various points around the base of the plant pot.

Preferably, the above plant pot includes drainage means enabling water to drain from the soil holding region into the water reservoir region.

In a preferred embodiment, the separation means is a separation plate. In this embodiment, the drainage means may include one or more perforations in the separation plate. Alternatively, the drainage means may include a drainage gap between the separation plate and a side wall of the plant pot. It is further preferred that the one or more perforations and/or drainage gaps are adapted so as to inhibit soil from passing into the water reservoir region.

It is further preferred that the plant pot includes soil watering means adapted to transfer water from the water reservoir region to the soil holding region. The soil watering means typically comprises an absorbent wick which extends between the water reservoir region and the soil holding region. In this embodiment, the absorbent wick may extend through an aperture in the separation means or through a gap between the separation means and the side wall of the plant pot.

In a particularly preferred embodiment, each plant pot includes a plurality of radially extending lobe sections and bridge sections, said bridge sections interconnecting the lobe sections. In a particularly preferred embodiment, the plant pot includes three lobe sections and three bridge sections. Each lobe section preferably defines a sub-cavity of the cavity of the plant pot. Each sub-cavity is preferably in open communication with a central cavity region.

In a particularly preferred embodiment, each plant pot comprises a plurality of lobe sections and interconnecting bridge sections, wherein each lobe section includes a base portion in an underside of which is located a recess and each bridge section includes a bridge rim adapted to be received within the recess of a lobe section of an upper adjacent plant pot. In this embodiment, a plurality of the plant pots of this invention are adapted to be stacked so that, in use, the lobe sections of adjoining plant pots are offset. In this way, the lobe sections of a plant pot do not obstruct the lobe sections of a lower adjacent plant pot.

Preferably the plant pot further comprises saucer engagement means for engagement with a saucer plate adapted to be located under the plant pot. The saucer engagement means may comprise 2 or more slits in base portions of the plant pot, said slits being adapted to couple with projections extending from the saucer plate. The slits are preferably located in the recesses of said base portions.

Typically the projections on the saucer plate are L-shaped tabs, each having a portion which is adapted to extend into the slit and to sit upon a lip of the slit.

The plant pot may further comprise saucer-centering means adapted to cooperate with a protruding section of the saucer plate so as to correctly align the saucer plate relative to the plant pot prior to engaging the saucer plate to the pot.

The protruding section of the saucer plate may comprise a circular ridge located near the centre of the saucer plate, said circular ridge being adapted to abut a correspondingly shaped section in the base of the plant pot.

The plant pot further preferably comprises a centrally located aperture adapted to have an elongated body pass therethrough. The plant pot may further comprise an island section (such as a cone or pyramid shaped section) located about the aperture and which extends from the aperture to a lower portion of the base of the plant pot. The elongated body is typically selected from a cord, a rope, a chain, a hose and a pipe. When the elongated body is a hose or a pipe, the body is adapted to transmit water therethrough. In this embodiment the elongated body may be perforated to enable water to exit from the elongated body. Such an embodiment is well adapted to be used in a stack of pots which may be situated on the ground or other surface.

In a further aspect of this invention there is provided a stack of the plant pots described above. In a preferred embodiment, the stack of pots includes the elongated body passing therethrough. When the stack is intended to be suspended from an overhanging support, the elongated body will typically be a cord, rope, chain or the like. The cord, rope, chain etc is typically connected to the lowermost plant pot. Generally, this is done by means of a disc, which is attached to an end of the cord, rope etc, and which underlies the base of the pot beneath the abovementioned island section of the pot. The cord, rope etc then extends upwardly through the apertures of the pots which are situated above.

When the stack is intended to be rested on the ground, the elongated body may be a hose, pipe or similar means for transmitting water through the stack. The hose or pipe may of course be perforated to enable easy. direct watering at different levels of the stack.

In a further preferred embodiment, the stack of plant pots further comprises the saucer plate adapted to be connected to a lowermost plant pot of said stack.

When the elongated body is a hose or pipe, said plant pot may further comprises a pump adapted to pump water through said elongated body. The pump may be located at any desirable location, such as between the saucer plate and said lowermost plant pot.

In one preferred embodiment, the stack of the plant pots is adapted to be used for hydroponic purposes. In this embodiment, additional holes may be located in the sides of the pots for this purpose.

BRIEF DESCRIPTION OF THE DRAWINGS

In order that the present invention may be more clearly understood, preferred forms will be described with reference to the following figures.

FIG. 4 is a top view of the plant pot of FIG. 2.

FIG. 5 is a bottom view of the plant pot of FIG. 2.

FIG. 8 is a side view of the stack of plant pots of FIG. 1.

DESCRIPTION OF PREFERRED EMBODIMENTS

Figure 1:
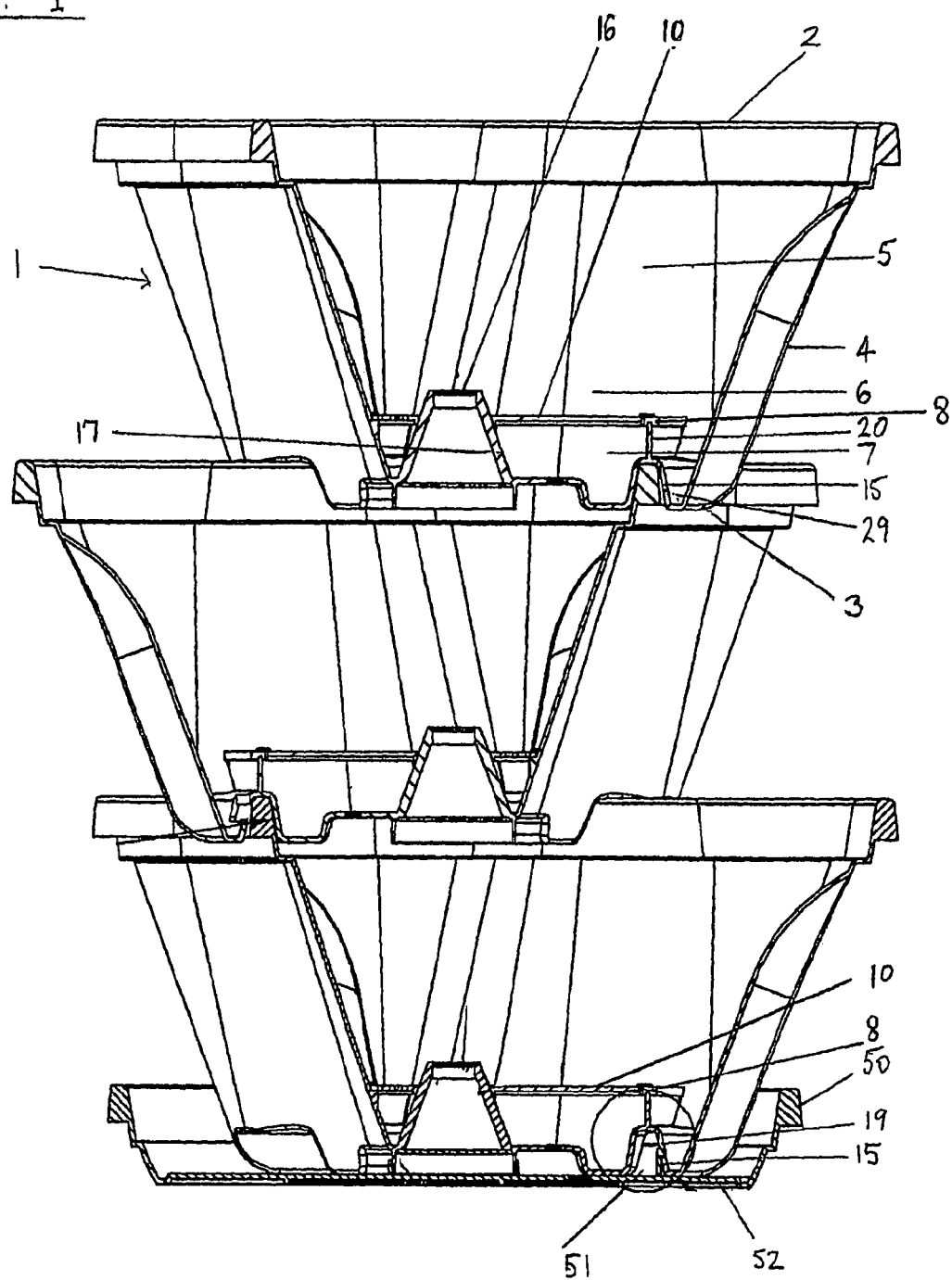
FIG. 1 is a side cross-sectional view of a stack of plant pots according to a preferred embodiment of this invention.
Figure 2:
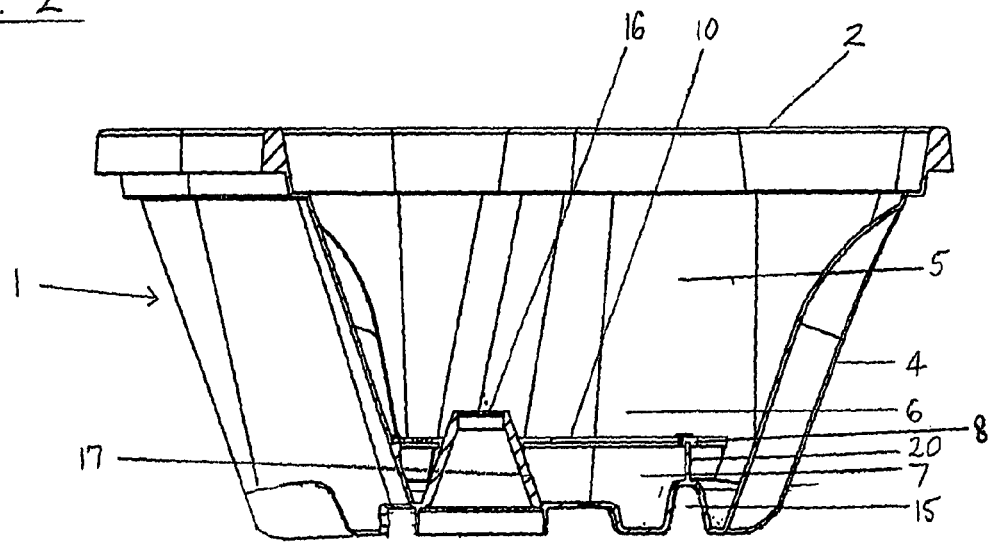
FIG. 2 is a side cross-sectional view of a single plant pot according to a preferred embodiment of this invention (but not showing the separation plate).

As shown in the diagrams, particularly FIGS. 1 and 2, a preferred embodiment of the present invention includes a plant pot 1 having an upper lip 2, a base 3 and a surrounding sidewall 4 which extends between the lip 2 and the base 3. The plant pot includes a cavity 5 laterally defined by the sidewall 4. The cavity 5 includes a soil holding region 6 and water reservoir region 7.

The soil holding region 6 and the water reservoir region 7 are separated by a separation plate 10. In the embodiment shown in the drawings, the plant pot also includes a dam wall 20. This dam wall 20 extends upwardly from the base 3 or, preferably, from a recess 15 within the base 3.

The base 3 may have a centrally located aperture 16. This aperture 16 is adapted to have a cord, rope, chain or other similar extension pass therethrough. Such a cord, rope, chain and the like may, thereby, pass through a stack of plant pots 1 and be affixed to an overhanging support from which the stack may be suspended.

The base 3 also preferably includes a centrally located indent section 17 which is located about the aperture 16 and which extends from the aperture to a lower portion of the base 3. This indent section 17 provides greater structural rigidity to the plant pot 1.

Located between the separation plate 10 and the dam well 20 are one or more gaps 8 adapted to enable overflow water to escape from the water reservoir region into an outer overflow sub-chamber 29.

Figure 3:
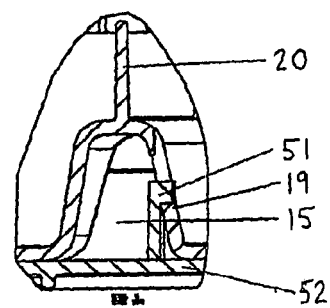
FIG. 3 is a cross-sectional view of the dam wall of the plant pot according to a preferred embodiment of this invention.
Figure 6:
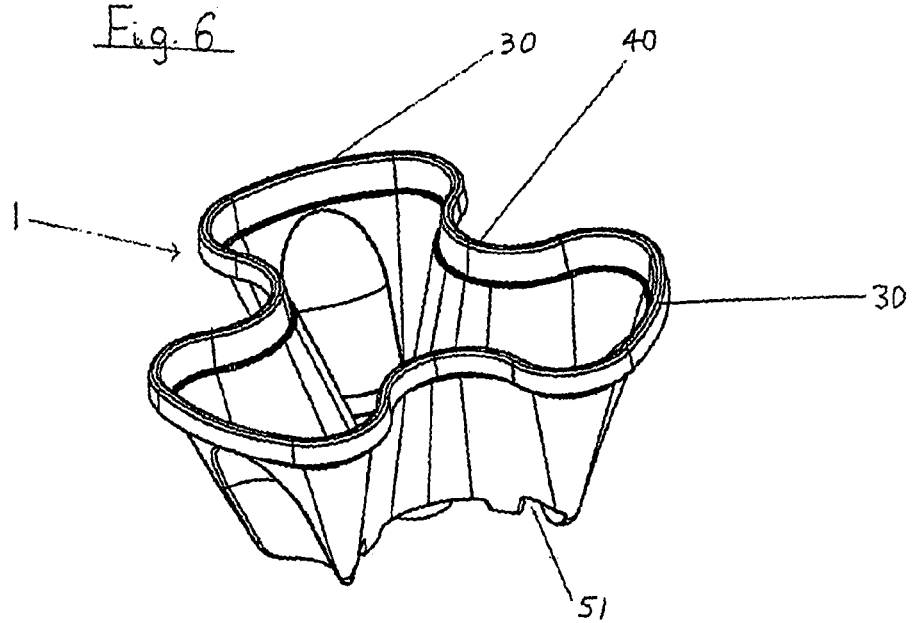
FIG. 6 is a top perspective view of the plant pot of FIG. 2.

As also shown in FIG. 1, a saucer plate 50 may be located underneath a plant pot 1, or underneath the lowermost plant pot 1 of a stack of plant pots. Typically, the plant pot 1 and the saucer plate 50 will have engagement means so that when the stack of plant pots is suspended, the saucer plate is connected to the lower most plant pot and, thereby, suspended with it. In the embodiment shown in FIG. 1, the saucer plate includes a L-shaped tab 51 extending upwardly from the saucer base 52. This L-shaped tab 51 is adapted to inter-engage with a corresponding hole or shoulder 19 located on the recess 15 of the base 3. This is more particularly shown in FIG. 3.

As shown in FIGS. 4 and 5, the plant pot 1 includes 3 lobe sections 30 and 3 interconnecting bridge sections 40.

Dam walls 20 are located within lobe sections 30. A central cavity region 25 is bounded by dam walls 20 and portions of the surrounding side wall which underlie the bridge sections 40.

Each of the lobe sections 30 includes a sub-cavity 27 which is the region in which a plant is preferably grown.

Figure 7:
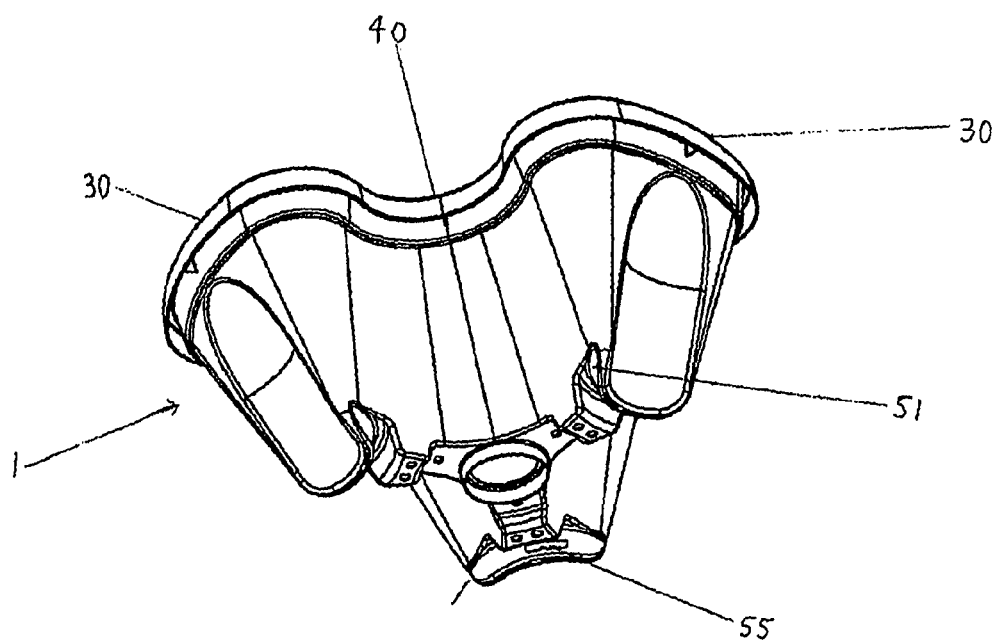
FIG. 7 is a bottom perspective view of the plant pot of FIG. 2.
Figure 9A:
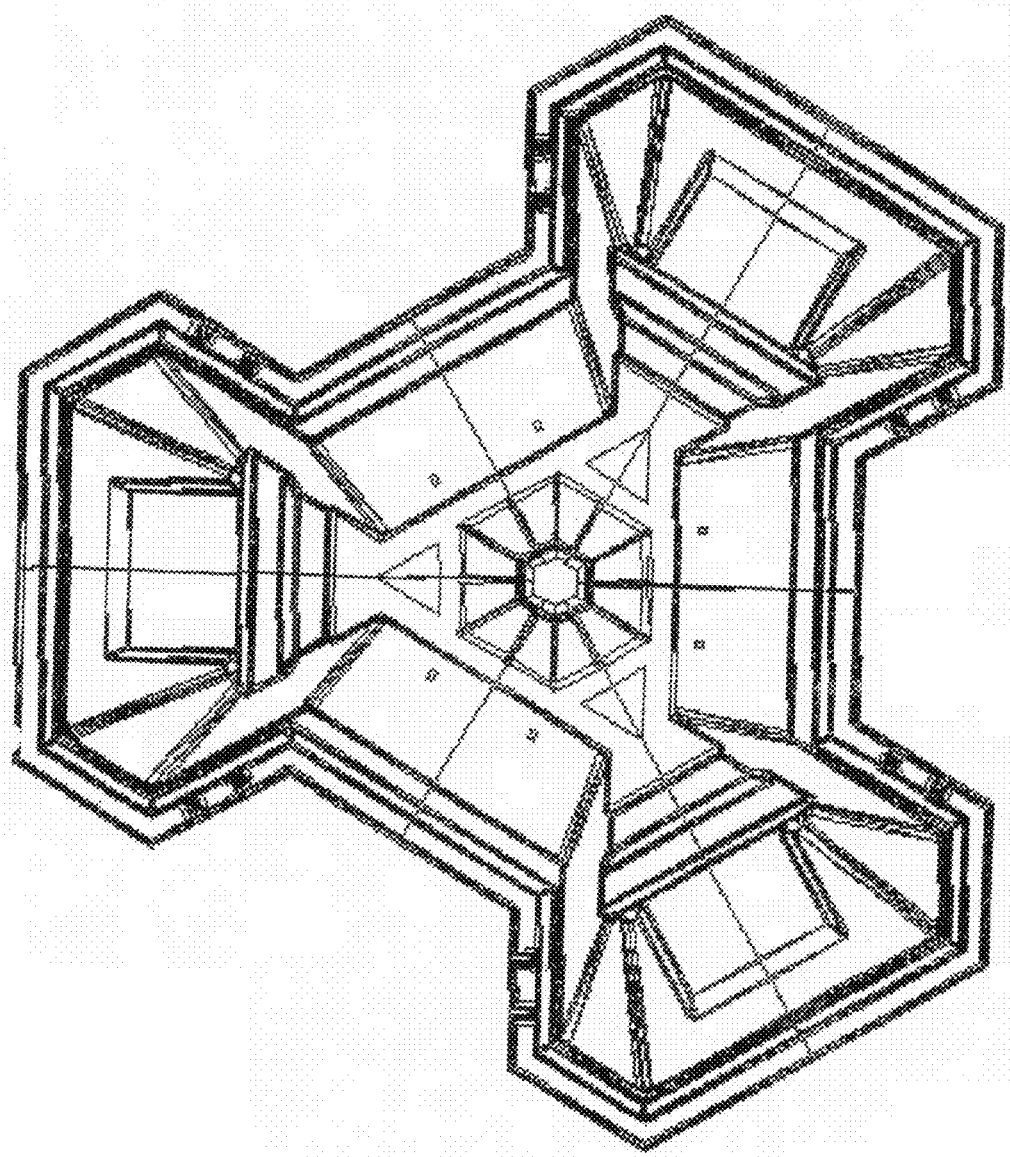
FIG. 9A is a top view of a plant pot according to an alternative embodiment of the invention.
Figure 9B:
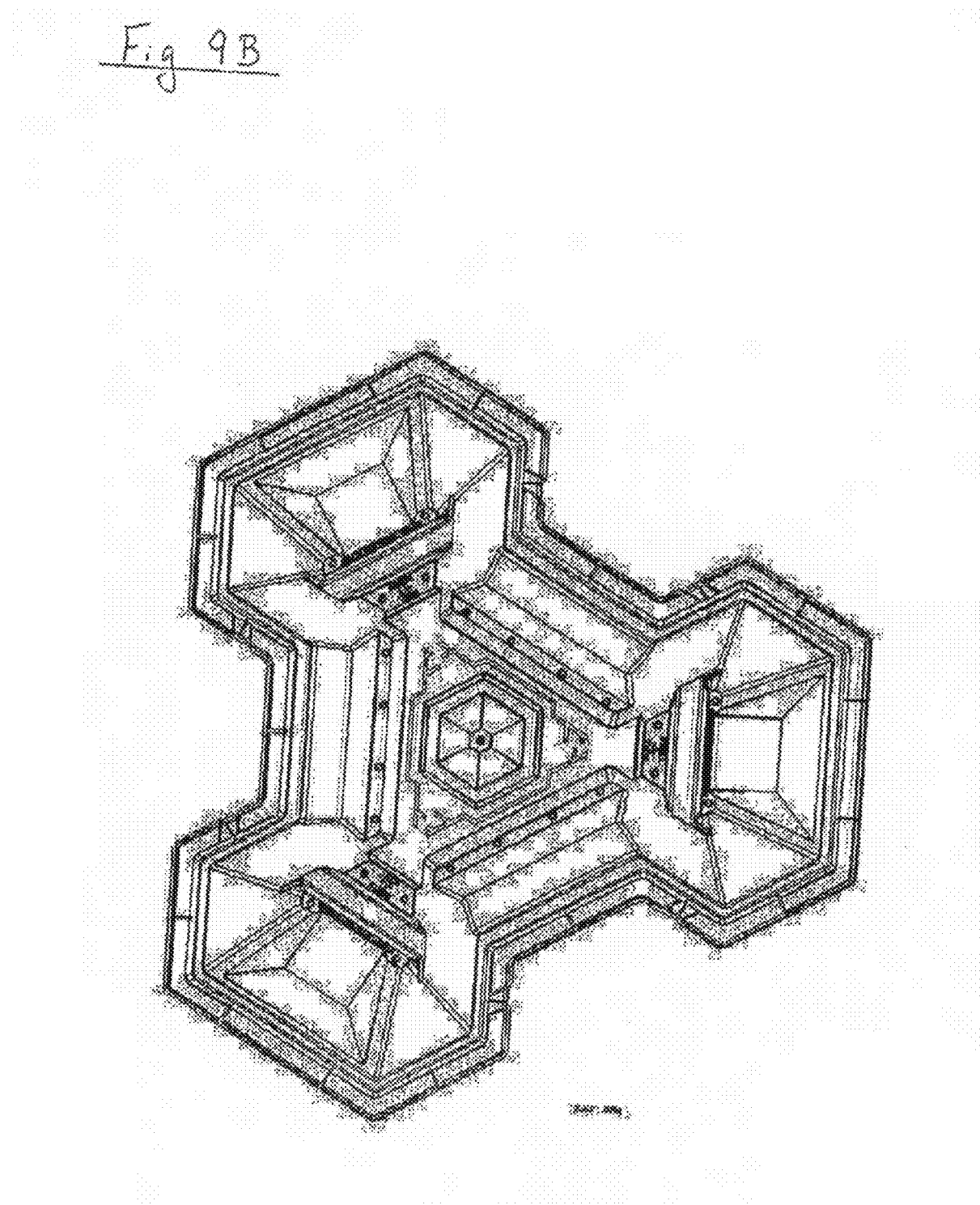
FIG. 9B is a top view of the plant pot of FIG. 9A (save that it has a slightly different configuration of holes).
Figure 9C:
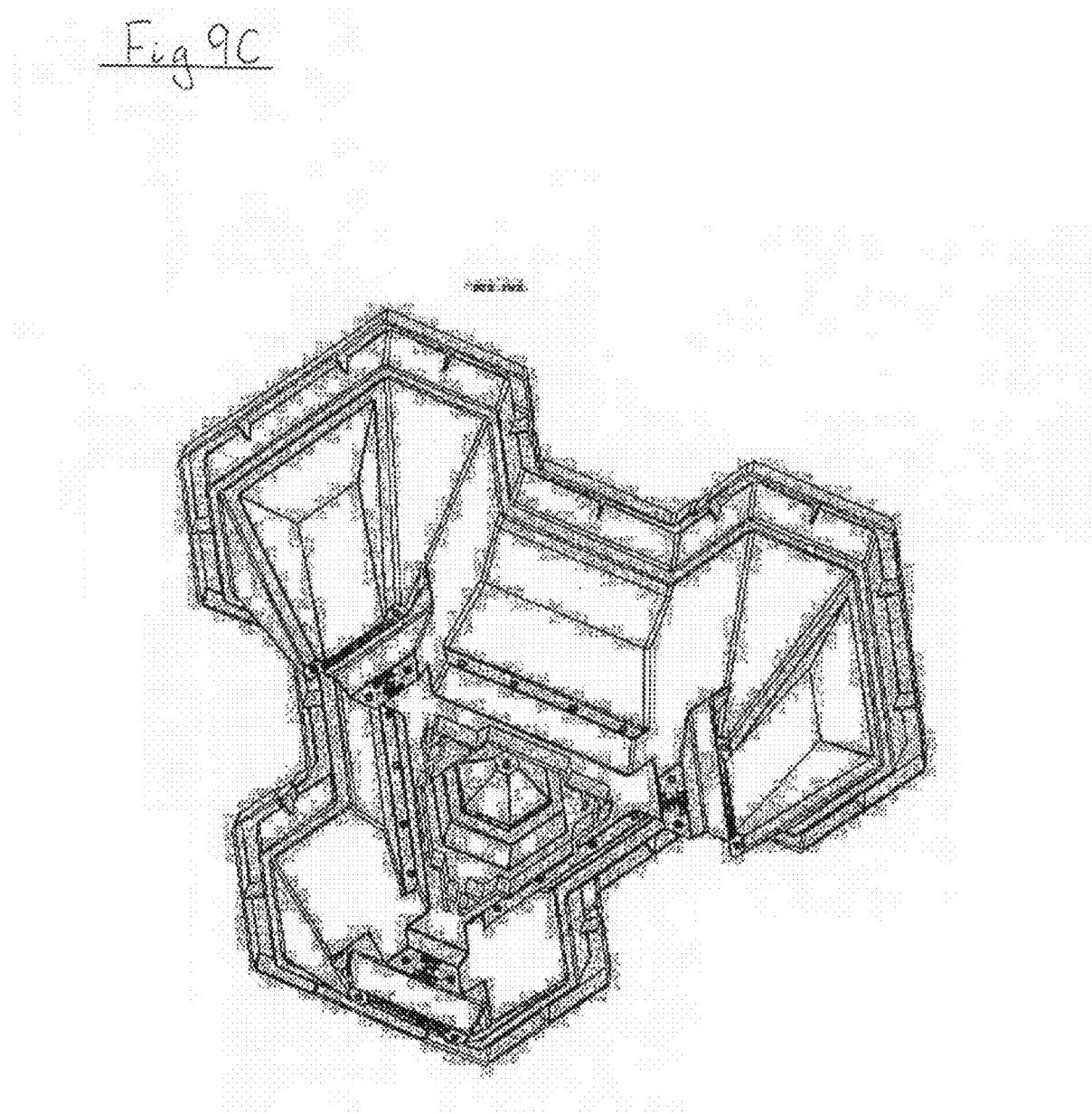
FIG. 9C is a bottom perspective view of the plant pot of FIG. 9B.
Figure 9D:
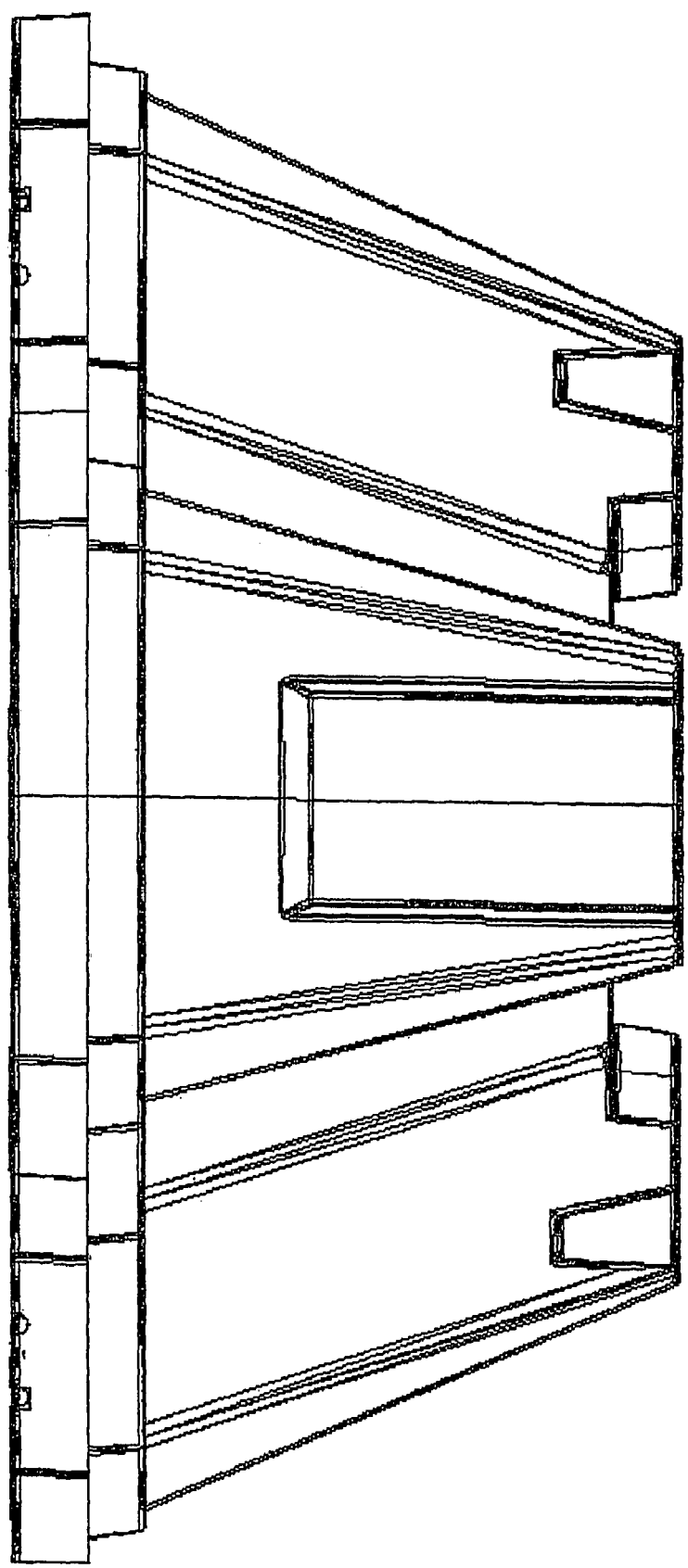
FIG. 9D is a side view of the plant pot of FIG. 9A.
Figure 10B:
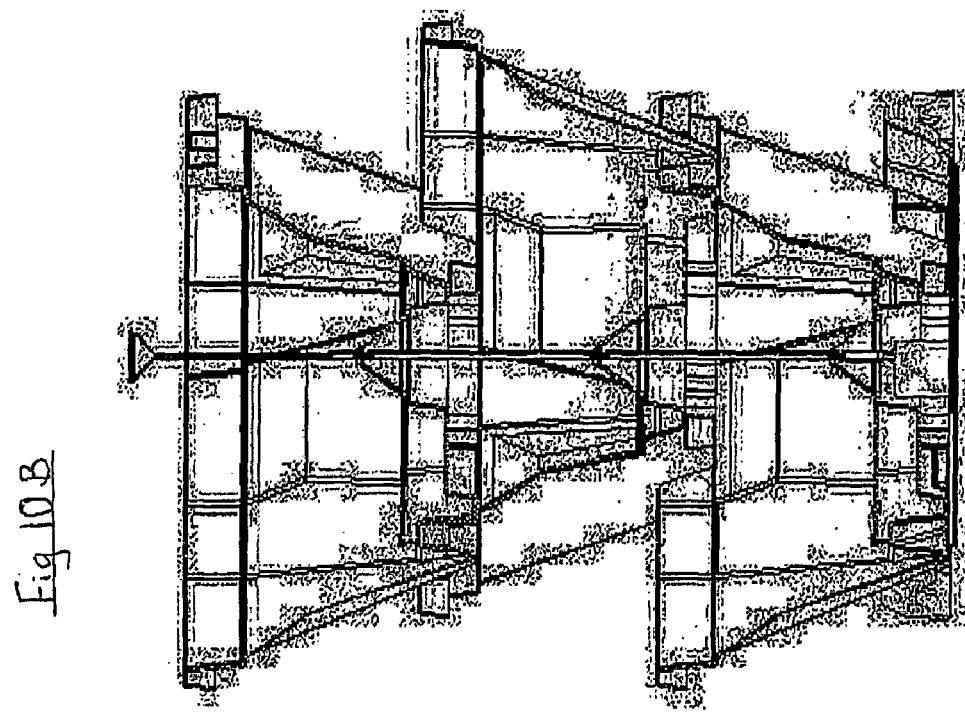
FIG. 10B is a cut-away side view of the stack shown in FIG. 10A.
Figure 10A:
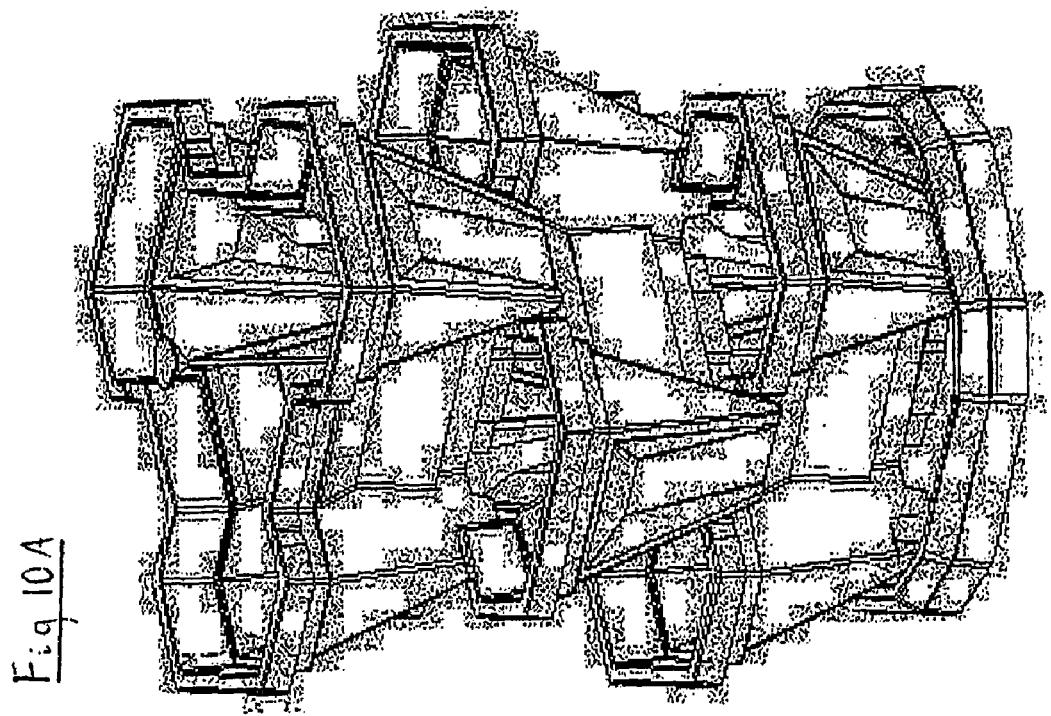
FIG. 10A is a top perspective view of an embodiment of a stack of the plant pots of FIGS. 9B and 9C.

On the external side of each dam wall 20 is located an overflow sub-chamber 29. Each overflow sub-chamber 29 has holes or gaps located therein. The holes or gaps are typically located in a bottom region of the sub-chambers. FIG. 7 shows a hole in the form of a slit 55 in one of the sub-chambers 29. These holes or gaps enable water to escape from the plant pot and drip into a lower plant pot in the stack.

The slit 55 may be positioned so that the water flows from it down into the adjoining lower plant pot. Alternatively, it may be positioned so that the water flows down into a lower plant pot but missing the adjoining lower plant pot.

The lobed sections and the bridge sections may be curved as shown particularly in FIGS. 4, 5, 6 and 7. Alternatively, the lobe sections and bridge sections may be angular (of any desired orientation) as exemplified in FIGS. 9 and 11.

Figure 11:
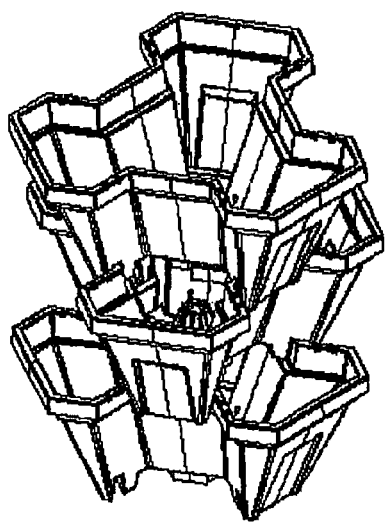
FIG. 11 is a top perspective view of a stack of plant pots according to alternative embodiment of the invention.
Figure 12A:
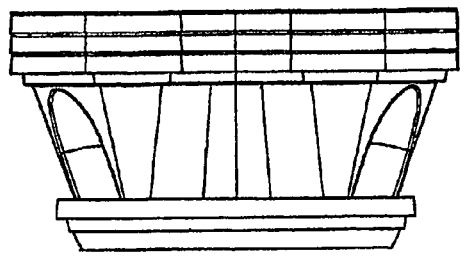
FIG. 12A is a side view of a storage mode stack of plant according to a preferred embodiment of this invention.
Figure 12B:
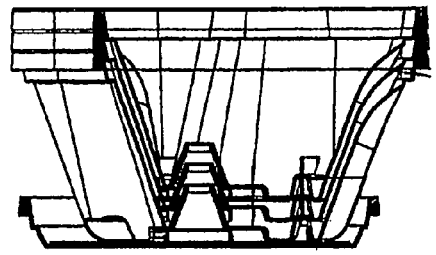
FIG. 12B is a side, partially cross-sectional view of the storage mode stack of plant pots of FIG. 12A.
Figure 13A:
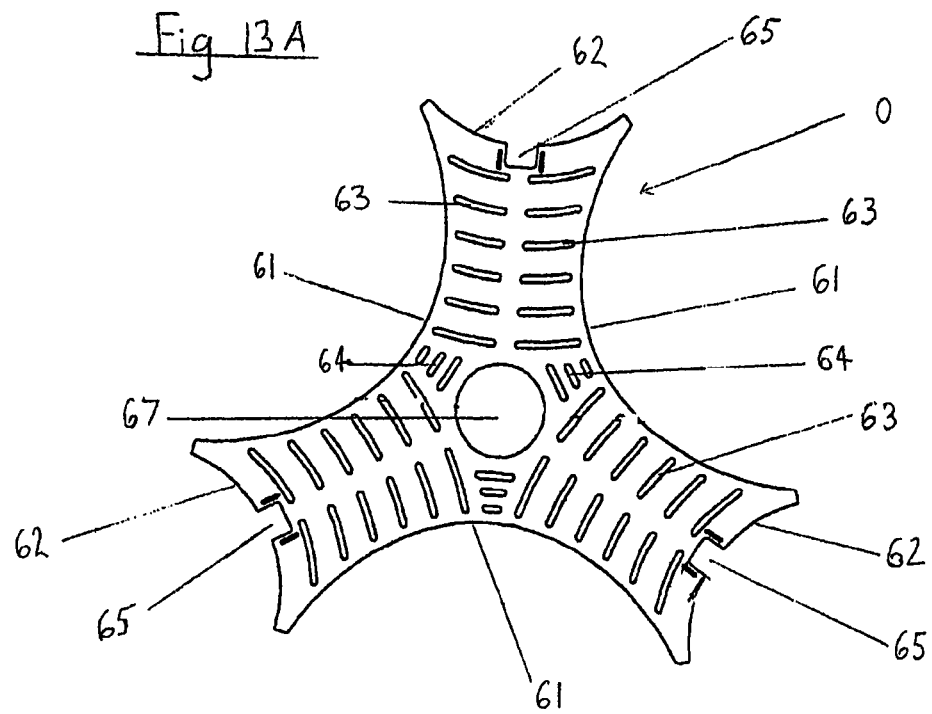
FIG. 13A is a top view of a separation plate of a plant pot according to a preferred embodiment of this invention.
Figure 13B:
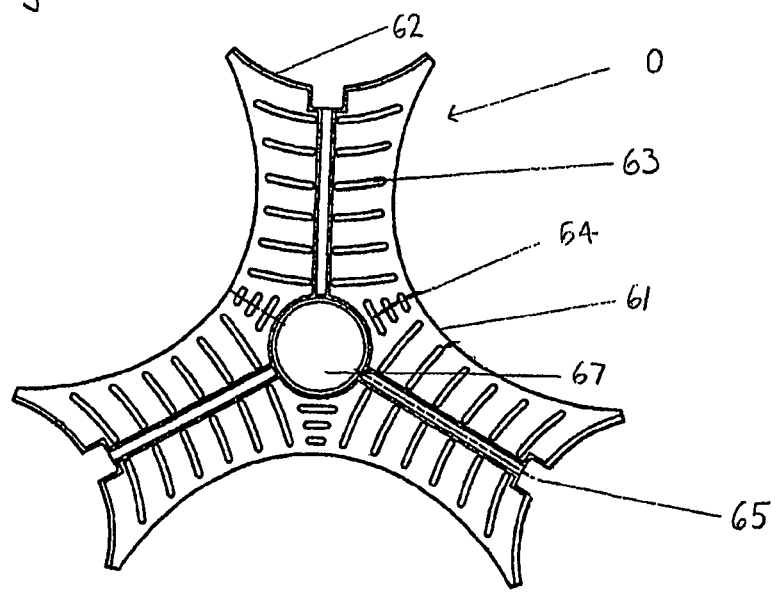
FIG. 13B is a bottom view of the separation plate of FIG. 10A.
Figure 13C:
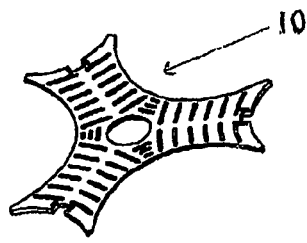
FIG. 13C is a top perspective view of the separation plate of FIG. 13A.
Figure 13D:
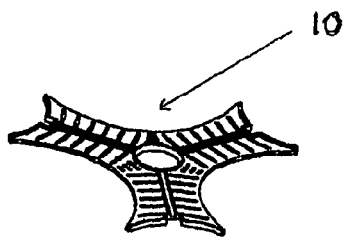
FIG. 13D is a bottom perspective view of the separation plate of FIG. 13A.
Figure 14A:
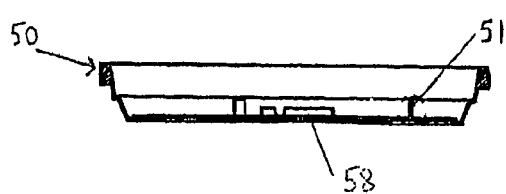
FIG. 14A is a side cross-sectional view of a saucer for use with a plant pot, or a stack of plant pots, according to a preferred embodiment of this invention.
Figure 14B:
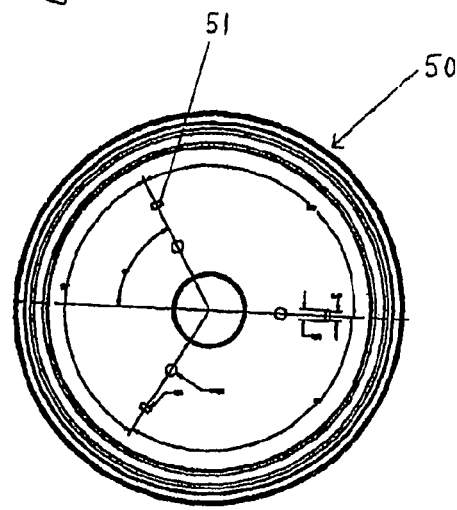
FIG. 14B is a top view of the saucer of FIG. 14A.
Figure 15:
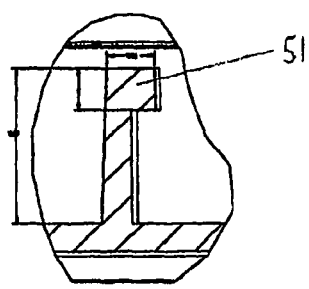
FIG. 15 is a partial cross-sectional view of a section of the saucer of FIG. 14A showing an engagement stub for engaging the saucer with an adjoining plant pot.
Figure 16:
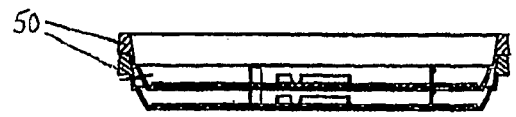
FIG. 16 is a side cross-sectional view of stack of two of the saucers depicted in FIG. 14A.
Figure 17:
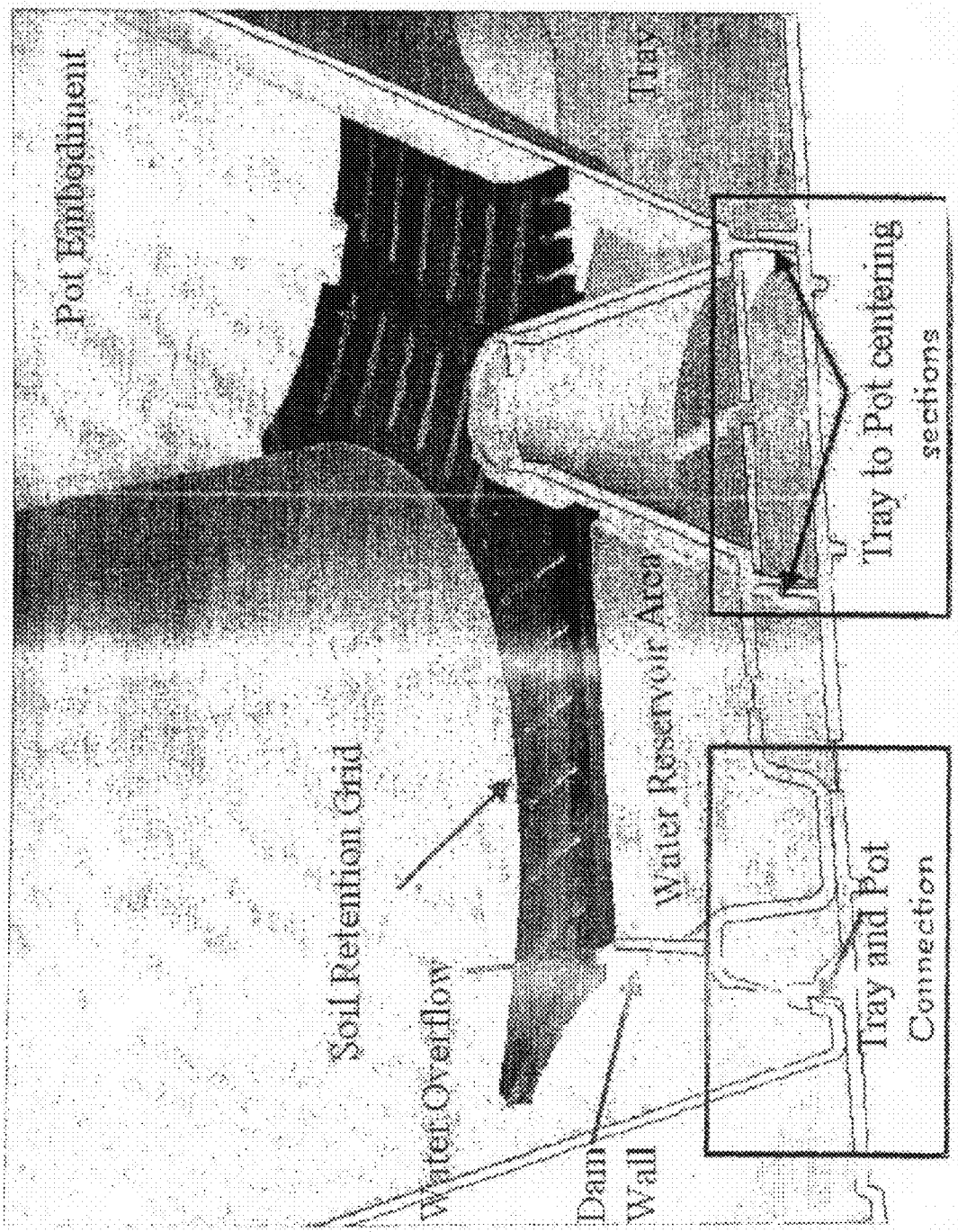
FIG. 17 is a CAD drawing of a cut-away section of a portion of a plant pot, with a saucer plate attached thereto, according to a preferred embodiment of this invention.
Figure 18:
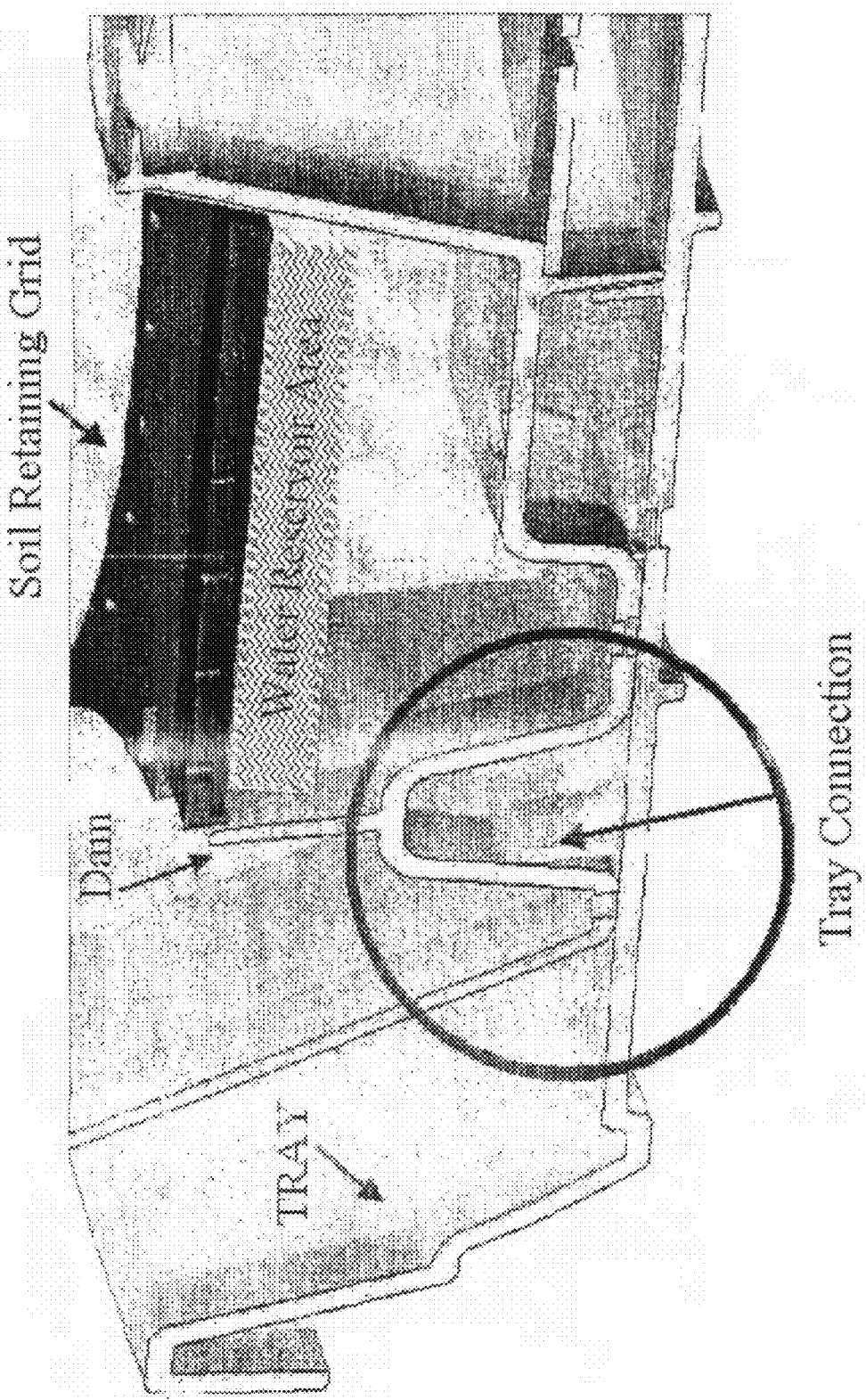
FIG. 18 is a CAD drawing of a closer view of a portion of the cut-away section shown in FIG. 17.
Figure 19:
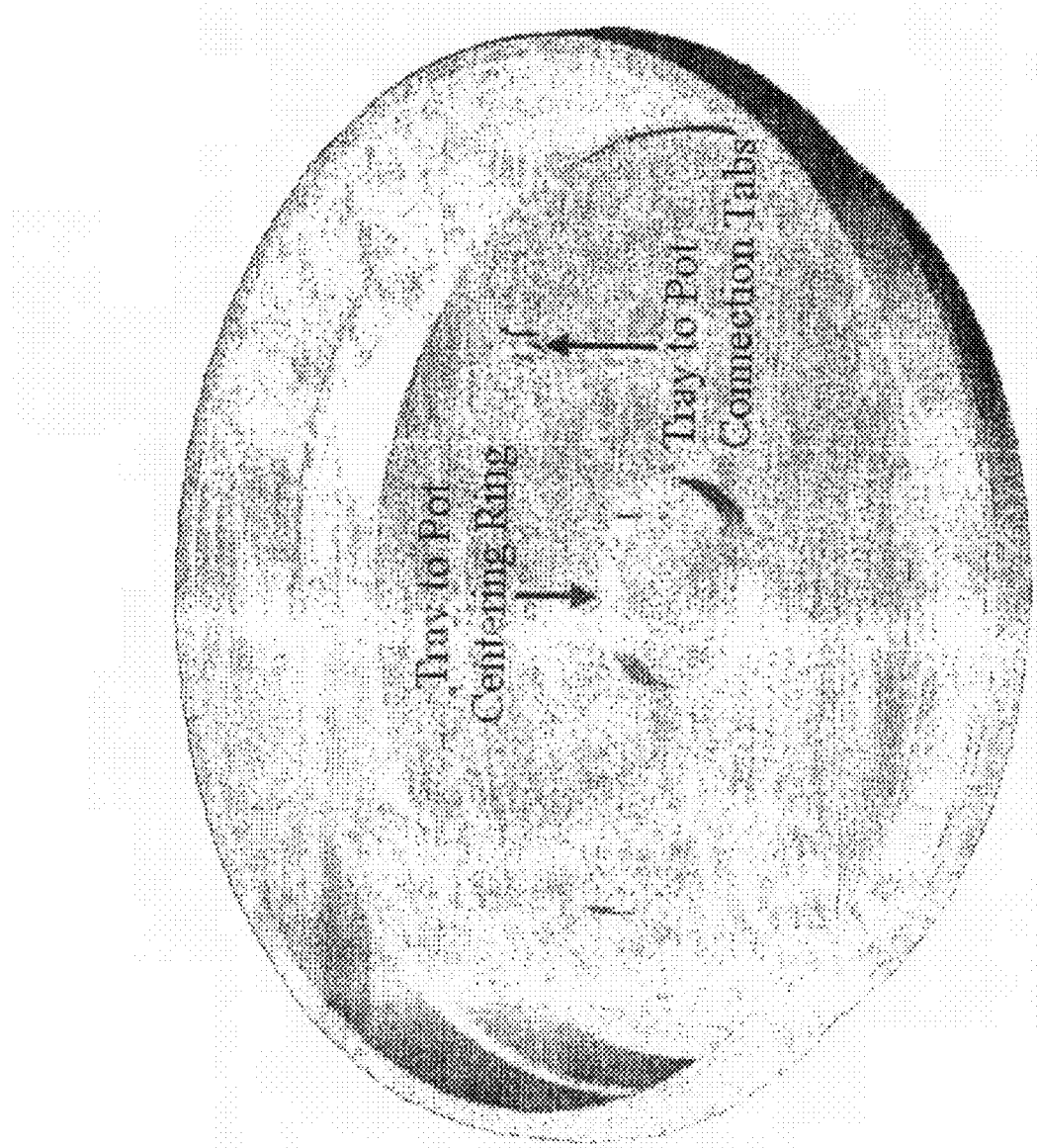
FIG. 19 is a CAD drawing showing a top perspective view of a saucer plate for use as part of the invention.
Figure 20:
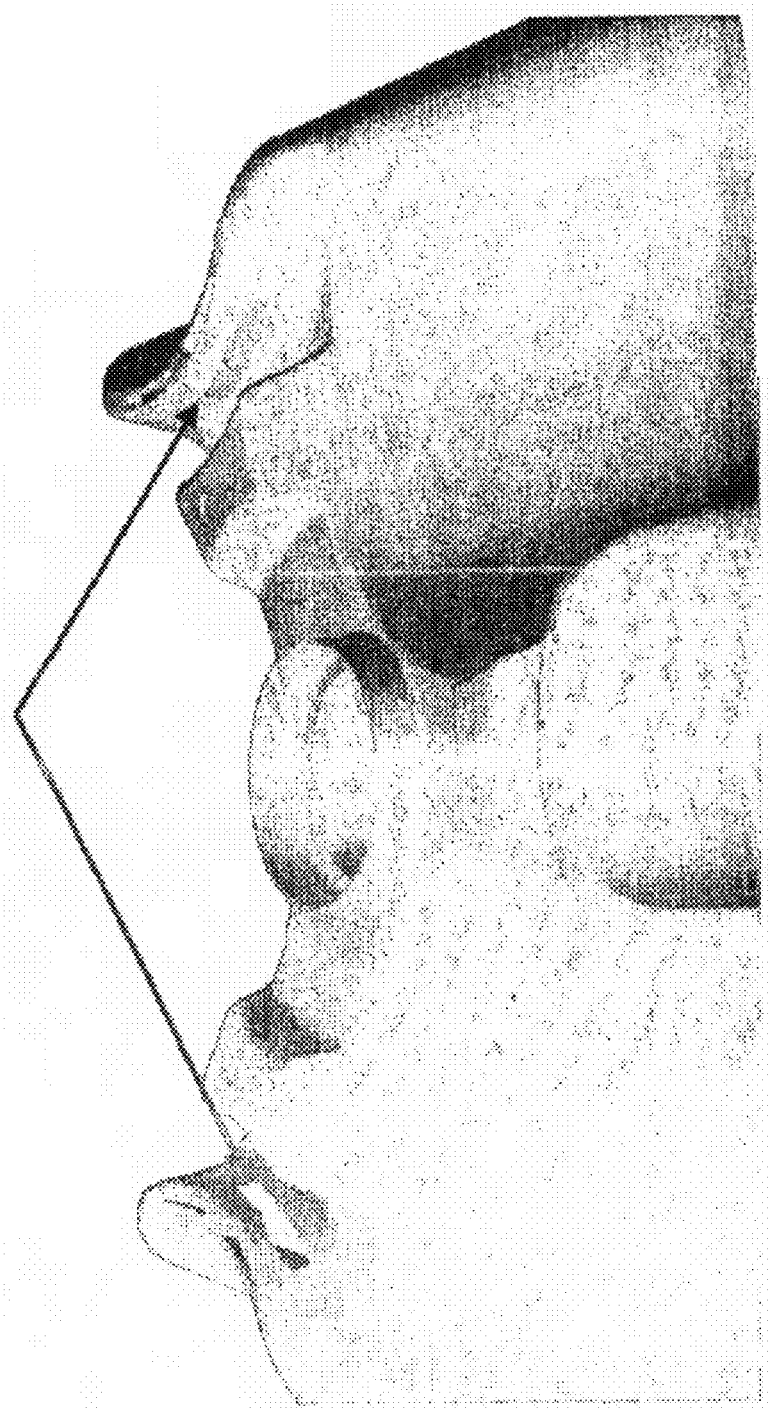
FIG. 20 is a CAD drawing showing a bottom perspective view of a portion of the plant pot according to a preferred embodiment of this invention.

The plant pots of the present invention are configured so that, in use, they may be stacked, one upon another, as shown in FIGS. 1, 8 and 11. They are also, preferably, configured so that, in storage mode, a plant pot can be seated within an adjoining plant pot, in stack formation as shown in FIGS. 12A and 12B.

FIGS. 13A to 13D show a separation plate 10 adapted to be seated within the plant pot 1. The separation plate 10 is shaped as to conform with the internal shape of the plant pot 1 and has curved sides 61 which, in use, abut internal portions of the side wall beneath the bridge sections 40 of the plant pot 1. The separation plate 10 also has curved end section 62 which, in use, abut portions of the curved side wall beneath the lobe sections 30 of the plant pot 1.

The separation plate 10 also has a plurality of drainage holes 63, 64 through which water drains from the soil holding region of the plant pot 1 to the water reservoir region. There is also a gap 65 located in the curved end section 62. This gap 65 is the gap through which the absorbent wick (not shown) passes, thereby transferring water from the water reservoir region to the soil holding region.

There is also a central hole 67 located in the separation plate 10. This central hole 67 is adapted to be in alignment with the aperture 16 of plant pot 1. This central hole 67 and the aperture 16 are adapted to enable a cord, chain, rope or other similar item to pass therethrough. This cord, chain, rope etc is adapted to be affixed to fixing means 58 located in the saucer plate 50.

Accordingly, in a preferred arrangement, there is a stack of plant pots 1, each of which contains a separation plate 10 which are stacked in offset orientation (as shown in FIGS. 1 and 8). The lower-most plant pot 1 is connected to a saucer plate 50 by virtue of the inter-engagement of the L-shaped tab 51 of the saucer plate 50 and the corresponding hole or shoulder 19 in the recess 15 of plant pot 1. A cord, chain, rope or the like is affixed to the saucer plate 50 and passes up through the centre of the stack, through the central holes 67 and the apertures 16. The upper end of the cord, chain, rope and the like can be tied or otherwise affixed to a support structure, such as a ceiling, pole, post or other similar item.

Typically, the abovementioned stack of plant pots can be watered by simply applying a water supply (e.g. from a hose or watering can) to the upper-most pot. Water is retained in the water-reservoir region of the pot and then additional (overflow) water reservoir region of each pot is full of water.

The above described stack of plant pots may incorporate self-watering means, such as a watering hose (or tube) which passes up through the internal central apertures of the pots.

Figure 21:
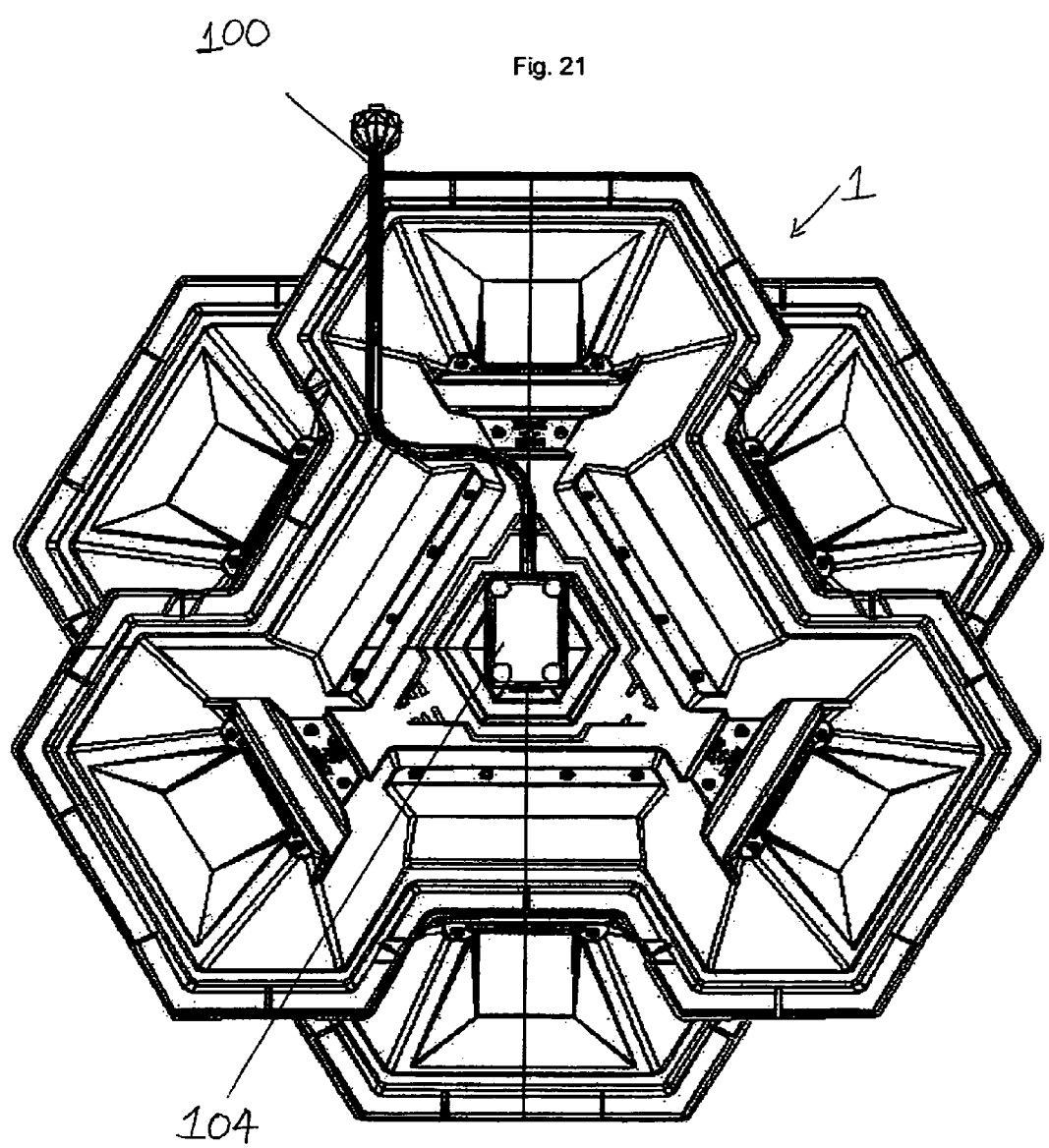
FIG. 21 is a bottom view of the stack of plant pots according to the present invention.
Figure 22:
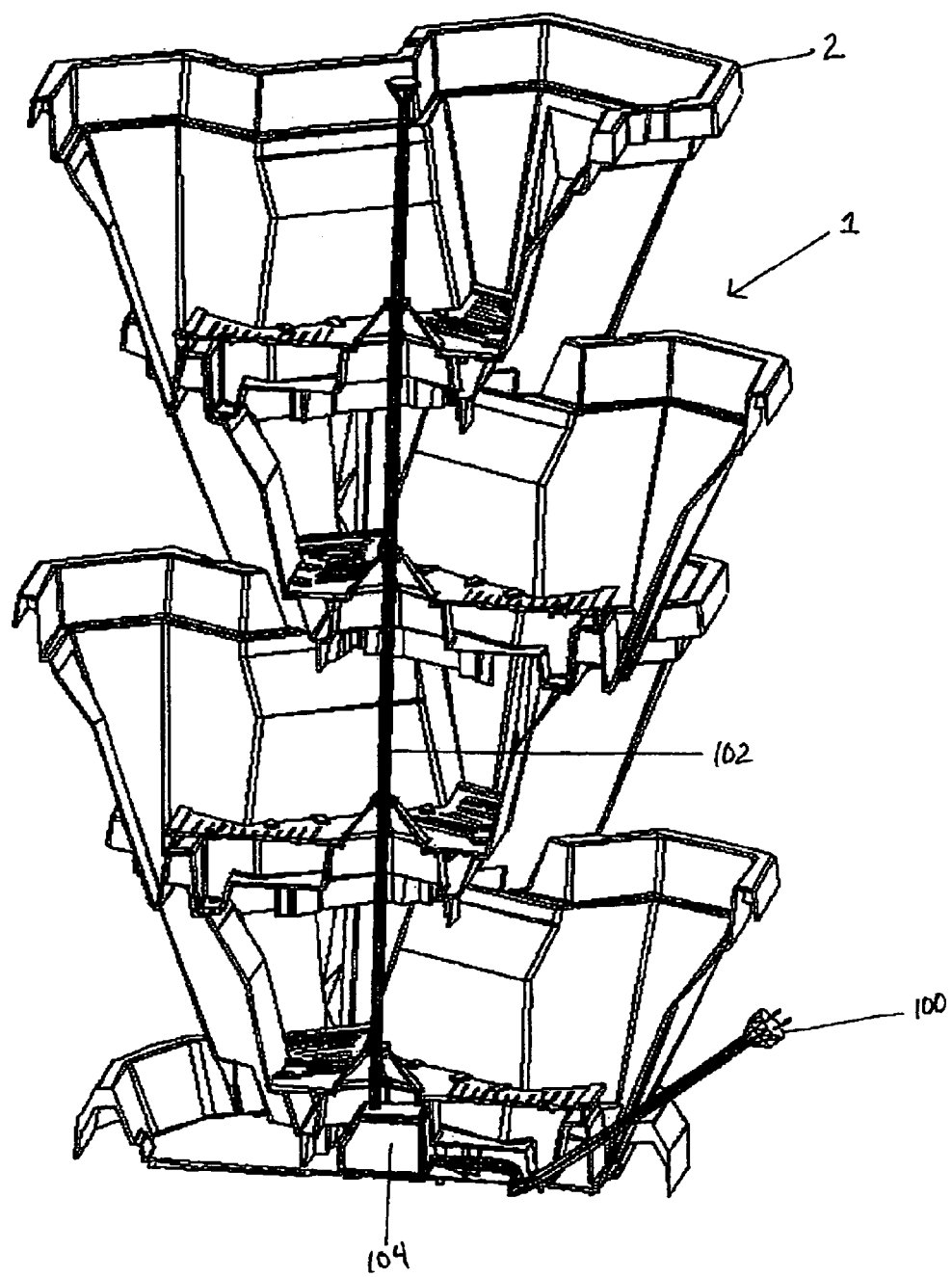
FIG. 22 is an isometric cross-sectional view of the stack of plant pots according to the present invention.
Figure 23:
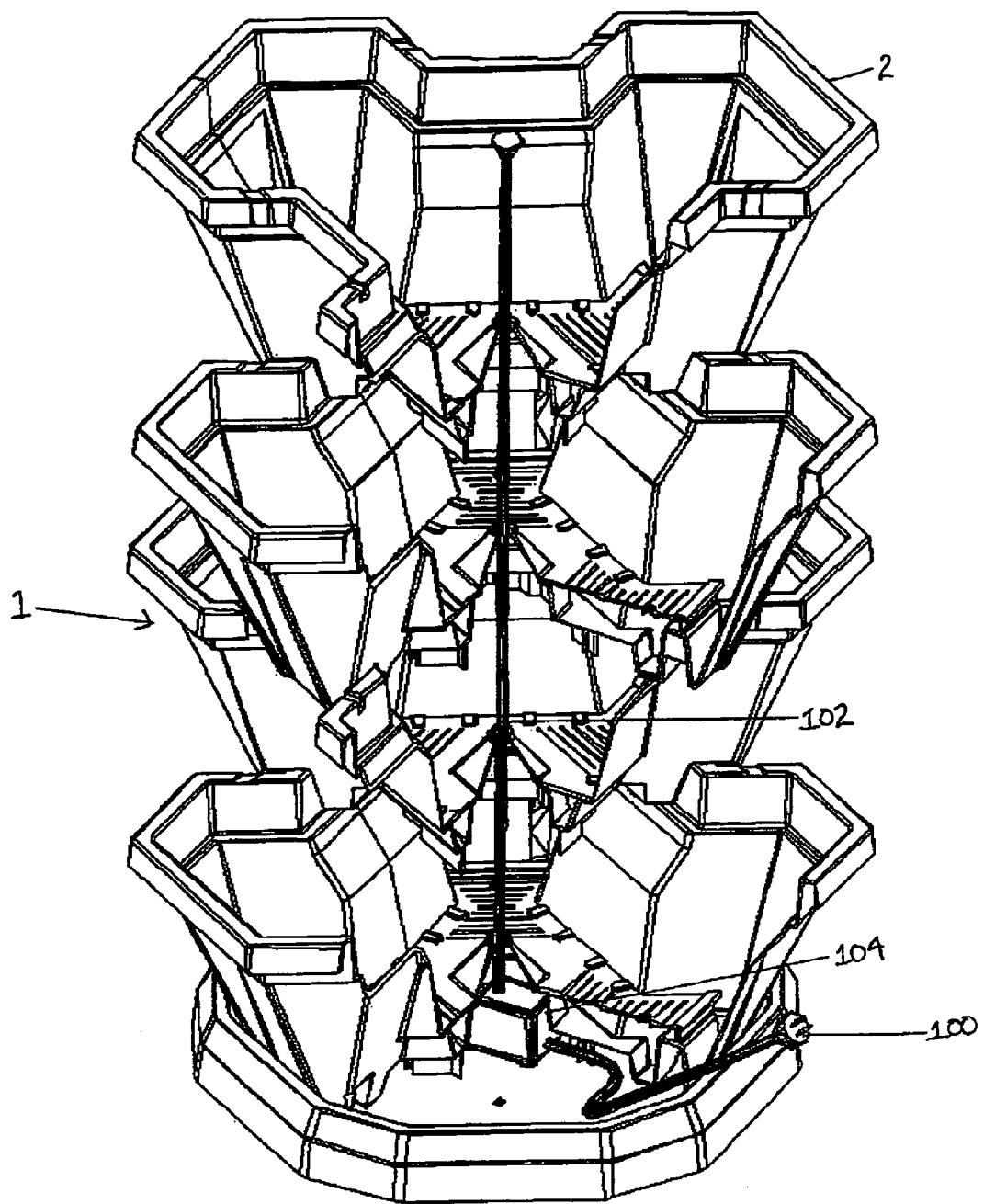
FIG. 23 is an isometric cross-sectional view of the stack of plant pots according to the present invention.
Figure 24:
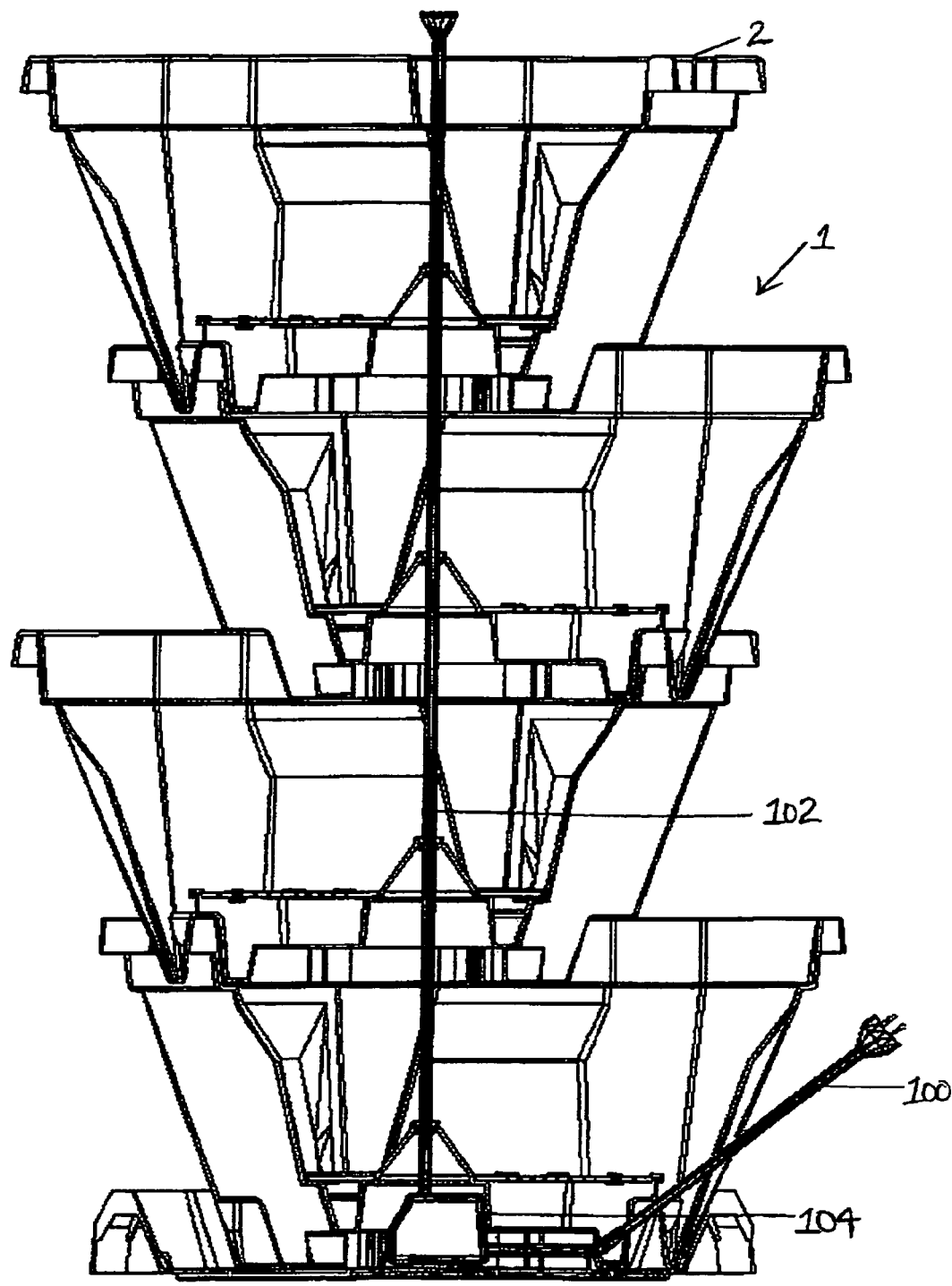
FIG. 24 is a side cross-sectional view of the stack of plant pots according to the present invention.

FIG. 21 shows a bottom view of a stacked olant pot 1 with the pump 104 fitted into the recessed indent in the pot 1 and the power lead 100 clamped without a tray. FIG. 22 illustrates an isometric cross-sectional view of the stacked giant pot 1 having an upper rim 2 and an elongated body 102 operationally connected to a pump 104 having a power lead 100. FIG. 23, is another illustration of an isometric cross-sectional view of the stack of plant cots 1. FIG. 23 shows the upper rim 2 of a pot 1 and the elongated body 102 operationally connected to a pump 104 having a power lead 100. FIG. 24 shows a side cross-sectional view of a stack of plant pots 1 with an upper rim 2 and an assembled pump 104. The power lead 100 is shown operationally connected to the pump 104, as is the elongated body 102.

Other preferred or alternate embodiments are further described below.

EXAMPLES

The drainage system of an embodiment of this invention has been designed to transform the stacked planting arrangement by the selective removal of blind drainage holes to enable it to have a number of uses, including:

(1) STANDARD COMPLETELY FREE DRAINING PLANTING SYSTEM—which is useful for plants such as cacti, succulents, orchids and begonia's etc.

Here the opening of certain 'blind' drainage holes, which are located at adjacent a lowermost point of the cavity is desired. The opening of such blind drainage holes helps to ensure that there are no overly moist areas in the plant pots.

(2) A SELF-WATERING STACKED PLANTING SYSTEM—which is useful for all moisture loving plants such as ferns, herbs, and annuals, etc.

Here only the opening of certain other drainage holes is required. These drainage holes are typically located above the base of the cavity so that some water is retained in the cavity. This will allow the cavity (ie water reservoir) to fill and maintain a self-watering feature and then overflow into the drainage chamber where any excess moisture will exit through the drainage holes.

(3) A HYDROPONICS STACKED PLANTING SYSTEM—which is useful for commercial growing of produce, eg strawberries, herbs, lettuces etc.

Here only the opening of certain drainage holes in side walls of the cavity is required. The use of an external or optional submersible pump is required in this embodiment.

The removal of these holes will allow water to partly fill each tub and then over flow through the side walls of each tub draining directly over the growing area of the tub immediately beneath and the in turn into the tubs drainage tray where the water is collected and redirected to the uppermost tub in the stack via the submersible pump completing the cycle (4) A CASCADING WATER FEATURE—which creates a visual delight used with ornamental stones mosses, grasses and water plants etc.

Here all blind drainage holes are left closed (intact) throughout the entire stack.

This will allow the uppermost tub to fill with water and overflow via the drainage gutters strategically positioned on the upper surface of each tubs outer-lipped area.

This will then fill the tub immediately below and then below that and so on until all overflow is collected in the saucer plate beneath the stack and redirected back to the uppermost tub in a reticulating manner via the submersible pump and start the whole process over producing a continuing cascading effect.

The word "comprising" and forms of the word "comprising" as used in the above description of the invention do not limit the invention to exclude any variants or additions. Modifications and improvements to the invention will be readily apparent to those skilled in the art. Such modifications and improvements are intended to be within the scope of this invention.

The invention claimed is:

1. A plant pot which, in use, is adapted to be stacked with one or more similar plant pots, said plant pot comprising:
   a cavity defined by a bottom wall and a side wall of the plant pot,
   wherein the side wall has lobed portions and when stacked in the offset the lobed portions section off growing areas of an adjacent plant pot and wherein the side wall has an overflow outlet adapted to enable excess liquid to flow out of said cavity and when stacked in the offset the excess liquid flows into a lower plant pot;

a reservoir region;

an elongated body;

an aperture located in the epicenter of the bottom wall and adapted to have the elongated body pass through the bottom wall wherein the bottom wall also has an indent section located about the aperture and which extends from the aperture thereby shielding the elongated body from water in the reservoir region;

a recess formed in the bottom wall opposite the cavity adapted to accent a pump; and a pump located in the recess, the pump being in fluid communication with the elongated body.

2. The plant pot according to claim 1, wherein the elongated body is a hose or a pipe adapted to transmit water therethrough.

3. The plant pot according to claim 2, wherein the elongated body is perforated to enable water to exit from the body.

4. The plant pot according to claim 1, further comprising a saucer plate, the saucer plate being disposed adjacent the bottom wall and the pump, and the saucer plate being shaped and configured to retain liquid flowing out of said cavity from the overflow outlet.

5. The plant pot according to claim 1 further comprising a separation means adapted to separate and define a water reservoir region and a soil holding region in the cavity.

6. The plant pot according to claim 5 wherein the water reservoir region is laterally defined, at least partially, by the side wall of the plant pot.

7. The plant pot according to claim 5 wherein the water reservoir region is laterally defined, at least partially, by a dam wall located inwardly of the side wall.

8. The plant pot according to claim 7 wherein the dam wall extends upwardly from the bottom wall of the plant pot.

9. The plant pot according to claim 8 wherein the dam wall substantially follows the contour of the side wall of the plant pot.

10. The plant pot according to claim 5 wherein the water reservoir region is laterally defined by a combination of both:
the sidewall of the plant pot; and
one or more dam walls.

11. The plant pot according to claim 5 wherein the overflow outlet comprises one or more holes in the side wall.

12. The plant pot according to claim 7 wherein the overflow outlet comprises one or more holes in an upper portion of the dam wall.

13. The plant pot according to claim 7 wherein the overflow outlet comprises a gap between an upper rim of the dam wall and the separations means.

14. The plant pot according to claim 13 wherein the separation means is seated upon the upper rim of the dam wall and the gap comprises one or more grooves, bites, cutouts or slots in the upper rim of the dam wall.

15. The plant pot according to claim 5 further comprising an overflow chamber adapted to receive excess water from the water reservoir region.

16. The plant pot according to claim 15 wherein the overflow chamber includes a drainage outlet for water to drain therethrough.

17. The plant pot according to claim 15 wherein the overflow chamber is laterally defined by an outer surface of the dam wall and at least a portion of the side wall.

18. The plant pot according to claim 5 further comprising soil watering means adapted to transfer water from the water reservoir region to the soil holding region.

19. The plant pot according to claim 18 wherein the soil watering means comprises an absorbent wick which extends between the water reservoir region and the soil holding region.

20. The plant pot according to claim 5 wherein said plant pot comprises a plurality of radially extending lobe sections and bridge sections, said bridge sections interconnecting the lobe sections.

21. A plant pot which, in use, is adapted to be stacked with one or more similar plant pots, said plant pot comprising:

a cavity defined by a bottom wall and a side wall of the plant pot
wherein the side wall has lobed portions and when stacked in the offset the lobed portions section off growing areas of an adjacent plant pot and
wherein the side walls have an overflow outlet adapted to enable excess liquid to flow out of said cavity and when stacked in the offset the excess liquid flows into a lower plant pot;

a reservoir region an elongated body;

an aperture located in the epicenter of the bottom wall and adapted to have the elongated body pass unrestricted through a plurality of bottom walls in a series of one or more plant pots positioned on the offset into a stacked formation wherein each bottom wall also has an indent section located about the aperture and which extends from the aperture thereby shielding the elongated body from water in the reservoir region;

a recess formed in the bottom wall opposite the cavity adapted to accept a pump; and a pump located in the recess, the pump being in fluid communication with the elongated body.

* * * * *